G. W. R. BAYLEY, OF ALGIERS, LOUISIANA.

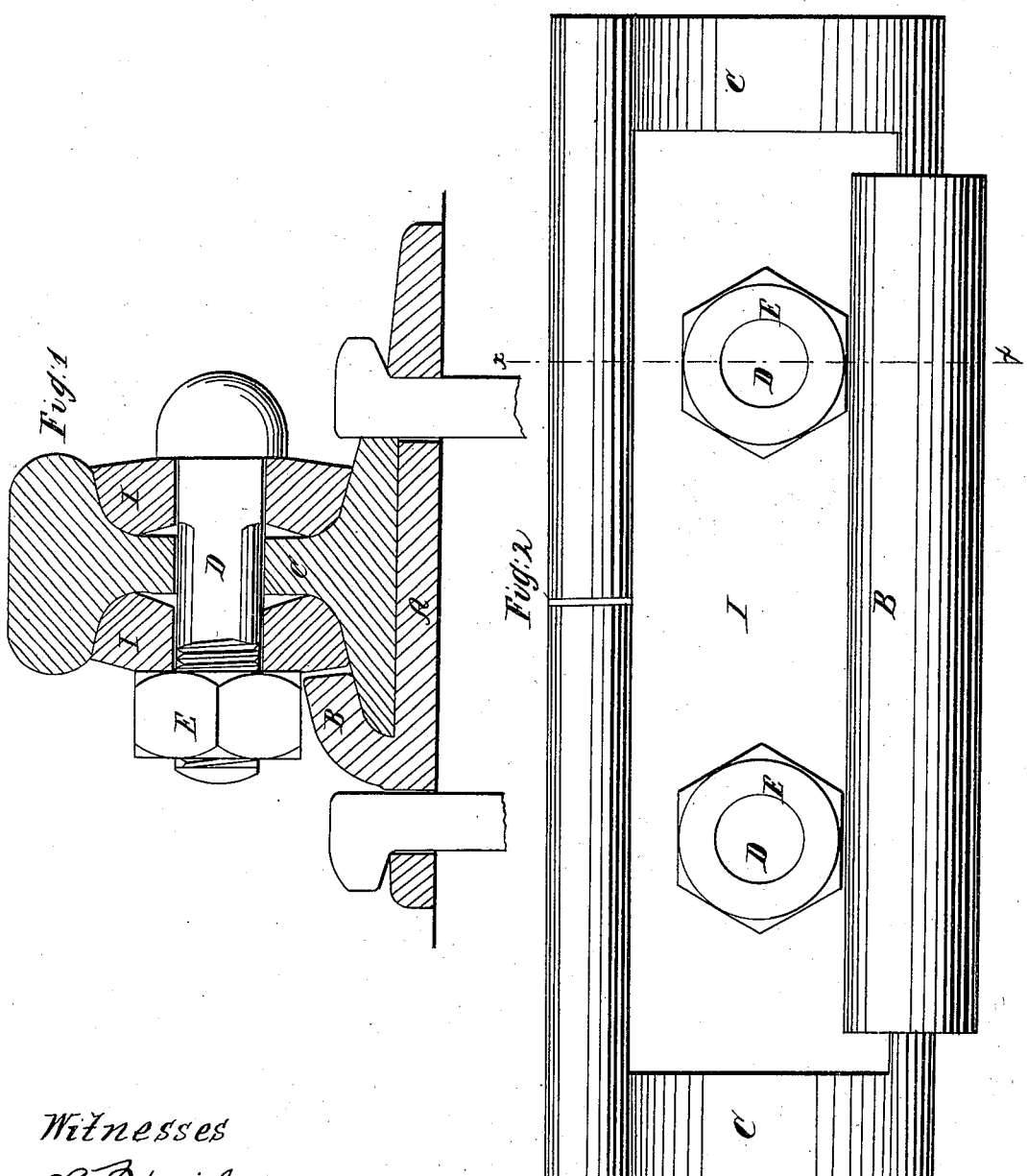

Letters Patent No. 85,357, dated December 29, 1868.

IMPROVED RAILWAY-CHAIR.

The Schedule referred to in these Letters Patent and making part of the same.

*To all whom it may concern:*

Be it known that I, G. W. R. BAYLEY, of Algiers, in the parish of Orleans, and State of Louisiana, have invented certain new and useful Improvements in Railway-Joints; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention relates to the joining of railroad-rails, or to the fastening of railroad-rail joints, where "fishing-bars" and screw-bolts are used to connect the ends of the rails; and It consists in a novel method of constructing and proportioning the rail-joint chair, in relation to the nuts of the rail-joint bolts, in such a manner as to lock them securely in place, and prevent them from working loose, as hereinafter more fully explained.

Figure 1 is a cross-section of a rail and its fastenings, taken on the line x–x of fig. 2.

Figure 2 is a side elevation of a rail at the joint, with the fastenings applied.

In constructing railroads it is desirable and common to unite the adjoining ends of the rails by means of splice-pieces, technically known as "fishing-bars," which consist simply of two short iron bars or plates, fitted to and placed, one on each side of the rails, between the head and base of the same, in such a position as to lap over each way past the joint formed by the abutting of the end of one rail against the end of another; these bars being secured to the rails by means of screw-bolts, there being at least one such bolt on each side of the joint, which pass from side to side, through the fishing-bars and the rail-ends. The heads of the bolts one side, and the nuts of the bolts, when screwed up, on the other side, clamp the fishing-bars firmly to the rails, and preserve that continuity of line and surface past the joint which is essential to smoothness of track.

In practice, however, it has been found extremely difficult to keep these fishing-bars tight upon the rails, for the reason that the jar, vibrations, and blows resulting from the passage of locomotives and cars over the rail-joints, cause the loosening or unscrewing of the nuts on the bolts, so that, after a time, the said nuts either work off entirely, or become so loose as to fail to hold the fishing-bars and rails snugly and firmly together.

Constant watchfulness and labor are necessary to detect these loose nuts, and tighten them up, but the screw-threads soon become so worn that the passage of each train loosens the nuts and the rail-joint.

To remedy this difficulty various devices have been invented for the purpose of locking the nuts of railroad-rail-joint bolts; but heretofore these devices have consisted of separate pieces, as wedges, pins, washers, &c., or in new forms of bolts and nuts, and while some have failed entirely to accomplish the desired end, others are expensive, difficult to apply or maintain, or are objectionable in other respects.

Now, my invention has for its object the accomplishment of the desired end, to wit, securely locking the nuts of railroad-rail-joint bolts, so as to prevent them from ever working loose, without the use of any unusual, extra, or detachable pieces, or of new and unusual forms of bolts or nuts.

In order to accomplish this, I provide a chair, A, having a lip, B, formed on it, as represented in fig. 1; this lip being of such a shape, size, length, and height, that when the bolts D are inserted through the fishing-bars I and the rails C, and the nuts E are placed thereon and screwed up, with their lower edges or sides in a horizontal line, the upper edge or surface of the lip B shall come close up under the lower edges or sides of the nuts, and thus securely lock the latter, and prevent them from turning, as shown clearly in figs. 1 and 2.

It is obvious that the general arrangement of the various parts of this rail-joint fastening, and their respective dimensions and proportions, should be such as to secure the desired end.

The diameter of the nuts must be such that the space under them, between them and the base or web of the rails, will correspond to the form and dimensions, or height and length of the lip of the chair B.

It is also obvious that the form and dimensions of the chair used, may be varied, and that it may have lips on both sides of the rail, if desired, provided, always, that the lip B, under the nuts, be of such a length and height, and of such form as to lock said nuts, in the manner substantially as herein set forth and described.

It is also obvious that any desired number of bolts can be used, and that the nuts of all of them can be securely locked by the same means, the chair being made of sufficient length to have its lip fit under all the nuts. Also, the joint may be placed on the cross-tie or sill, or between two of them.

If preferred, the lip, instead of being formed in one continuous piece or elevation, as represented in fig. 2, may be formed in separate elevations, so located that one shall come under each nut, or each pair of nuts.

In applying my invention, the fishing-bars I are first bolted to the rails C, and then the chair A is slipped or driven on and under the rails C, thus bringing the lip B under the nuts, as represented in the drawings. Afterwards the chair is secured to the cross-ties, sills, or timbers, by means of spikes, or otherwise.

While the chair remains in its proper position, it is obvious that the nuts of the rail-joint bolts cannot be turned or removed; therefore, by these means, I lock the nuts securely in place, thus securing a firm joint, in a simple and perfect manner, without the use of any separate locking-devices.

I am aware that single and double-lipped chairs have been used for rail-joints, and that single-lipped chairs have been used with bolted joints, but such chairs have never been constructed in such a manner as to admit of their being used, nor have they ever been used for the purpose of locking the joint-bolt nuts.

Having thus described my invention,
What I claim, is—

1. So constructing and arranging the lip of a railway-joint chair, that it shall fit snugly under the nuts E of a bolted rail-joint, and thereby lock the nuts, so as to prevent their turning or becoming loose, substantially as described.

2. The combination of the lip B of a railway-joint chair, and the nuts E of the joint-bolts, substantially as described.

G. W. R. BAYLEY.

Witnesses:
 THOS. H. STEPHENS,
 ALFRED A. FUNLIER.